United States Patent Office 3,475,882
Patented Nov. 4, 1969

3,475,882
SEPARATING COMPONENTS IN GASES
Stuart A. Hoenig, Tucson, Ariz., assignor to The Battelle Development Corporation, Columbus, Ohio, a corporation of Delaware
Filed June 14, 1968, Ser. No. 737,041
Int. Cl. B03c 3/08, 3/74, 3/47
U.S. Cl. 55—179
5 Claims

ABSTRACT OF THE DISCLOSURE

Acceptor components of a gas are adsorbed on an n-type semiconductor surface, donor components on a p-type surface. Any excess gas is removed. The conductivities of the surfaces are then modified, as by reversing them. Acceptor components of the gas are desorbed from the now p-type semiconductor surface to an adjacent chamber. Donor components are desorbed from the now n-type surface to a different adjacent chamber. Conductivities are controlled by an electric field gradient or by radiation.

BACKGROUND

Figure 1:
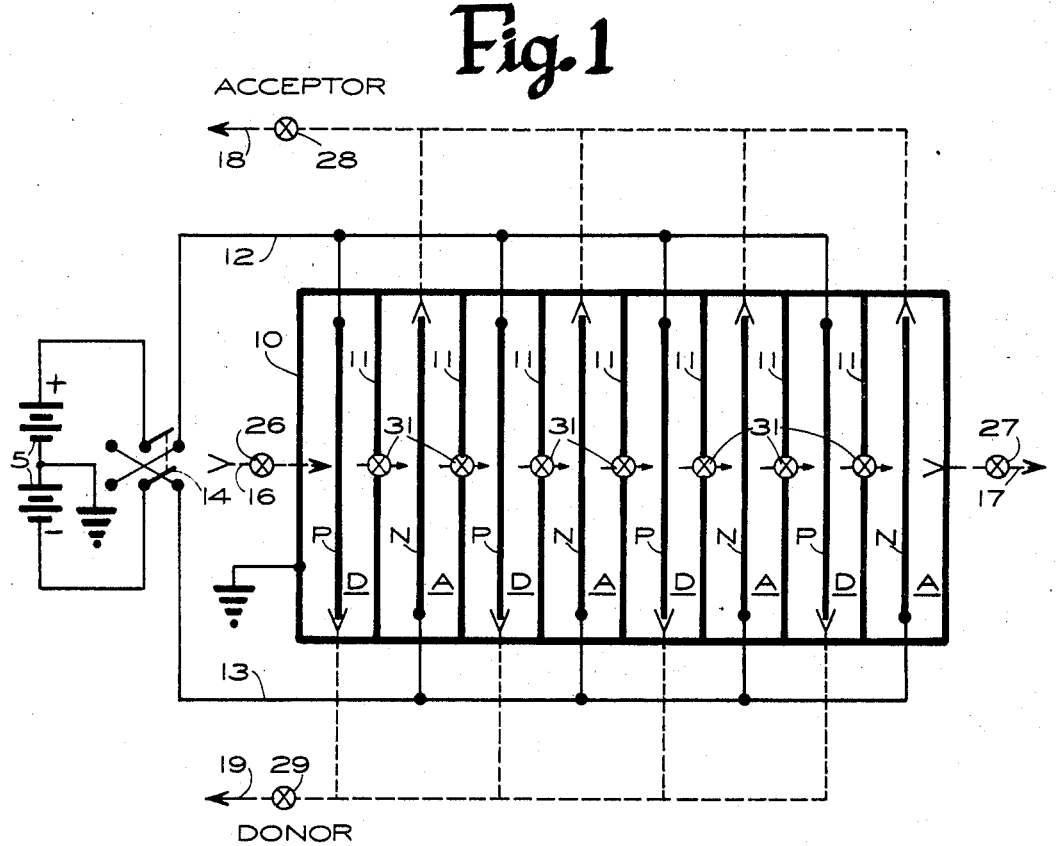

This invention relates to the separation of components in gases and comprises primarily apparatus for selectively adsorbing donor and acceptor components at separate locations and then desorbing each into a separate chamber.

Every reaction between a gas and a solid begins with adsorption, the entrance of the gas into the solid. It is customary to distinguish between adsorption, which implies a solution or concentration of the gas near the surface, and absorption, which might be typified by the action of a sponge. In fact it is difficult to separate the phenomena, and the general term sorption is sometimes used for both processes.

"Adsorption" is used herein to mean any reaction in which a gas is bound to a solid in some more or less permanent fashion. This bonding is the first step in any rusting, oxidation, catalysis, or gas drying process. A major application of adsorption is in the drying of gases. A typical case is that of natural gas which must be dried to prevent clogging of gas pipelines. Another case is that of manufactured items that are packaged with a moisture adsorbent to prevent rusting in storage. Adsorbents are often used for the removal of carbon dioxide or carbon monoxide from confined environments, such as submarines. Other applications include separation of sulfur dioxide from smelter stack gases and oxygen from hydrocarbons.

When the adsorbent is saturated, it must be discarded or recycled by heating. This is slow because of the low thermal conductivity of porous adsorbent materials, and inefficient because the adsorbent must be physically moved or heated and cooled in place. Another major difficulty with adsorbents is their nonspecific nature. An adsorbent for water vapor will take up other condensable gases, and this limits the use of adsorption for gas separation.

The commercial aspects of these problems have generated much effort aimed at understanding adsorption processes. Unfortunately there is no general theory which explains adsorption. This makes it difficult to design new adsorbents for industrial processes.

Thus it is clear that a need exists for adsorbents which can be recycled in situ without heating. If such adsorbents were selective for a certain gas or type of gas such as a donor or an acceptor, this would be an even greater advantage. The present invention comprises novel apparatus for separating one type of gas from another by selective adsorption and desorption in situ.

SUMMARY OF THE INVENTION

Typical apparatus according to this invention for separating donor components from acceptor components in gases comprises in combination:

Means for providing originally an n-type semiconductor surface capable of adsorbing acceptor components of a gas;

Means for providing originally a p-type semiconductor surface capable of adsorbing donor components of a gas;

Means for exposing the surfaces to a gas;

Means for removing from communication with the surfaces substantially all of the gas not adsorbed after exposure of the surfaces thereto;

Means for modifying the conductivity of the n-type surface (to be less n-type and more p-type) sufficiently to desorb substantially all of any gas component adsorbed thereto;

Means for modifying the conductivity of the p-type surface (to be less p-type and more n-type) sufficiently to desorb substantially all of any gas component adsorbed thereto;

Means for collecting any gas component desorbed from the originally n-type surface at a first location; and Means for collecting any gas component desorbed from the originally p-type surface at a second location that is separated from the first location.

The conductivity modifying means may reverse the conductivities of the respective surfaces, as where the surface providing means comprise means for originally subjecting the surfaces to an electric field, and the conductivity modifying means comprise means for subjecting the surfaces to an electric field of polarity opposite to that of the field to which they were originally subjected. In an alternative form of the invention the conductivity modifying means may comprise means for subjecting the surfaces to radiation of such wavelength as to generate electrons and holes.

As used herein, "modifying" means changing the nature of the majority charge carrier in the semiconductor. An electron conductor (n-type) is modified by the electric field or by the radiation in such a way that part or all of the semiconductor becomes less n-type and more p-type. Similarly, a hole conductor (p-type) is made to become less p-type and more n-type. In either case the modification may be great enough to reverse the type of conductivity.

"Electric field" as used herein means "electric field gradient." It is to be understood that it is a field gradient that can modify a semiconductor rather than a field itself. As an example, two metal plates having a voltage difference $v$, in volts, and separated by a distance $d$, in meters, have a voltage gradient between them of $v/d$, in volts per meter.

DRAWING

FIG. 1 is a schematic plan view of typical apparatus according to the present invention.

FIG. 1 is a schematic plan view of another form of apparatus according to the invention.

PREFERRED EMBODIMENTS

FIG. 1, description

Referring to FIG. 1, a fluid-tight conductive container 10 is divided into several compartments by interior conductive walls 11 arranged parallel to each other and approximately equally spaced throughout the container 10. In the alternate compartments D are conductive members P, one in each compartment, which may be in the form of plates, porous metal, or screens parallel to and approximately midway between the adjacent walls 11. In each of the other alternate interior compartments A is a similar conductive member N located parallel to and approximately midway between the adjacent walls 11. The surfaces of the conductive members N comprise a coating of semiconductor material, such as zinc oxide, which is normally n-type and the conductivity of which can be modified substantially by electric fields. The surfaces of the conductive members P comprise a coating of semiconductor material, such as nickel oxide, which is normally p-type and the conductivity of which can be modified substantially by electric fields. The container 10 and walls 11, which may be made of any suitable conductive material such as metal or metal-coated plastic, serve as grounded counterelectrodes for the application of controlled field gradients to the semiconductor films on both sides of the supporting plates N, P, which are electrically insulated from the container 10 and the interior walls 11 as are also the conductors connected to the plates N, P.

Each conductive member P is connected by a conductor 12 to one output contact of a double-pole double-throw reversing switch 14. Each conductive member N is connected by a conductor 13 to the other output contact of the reversing switch 14. The input contacts of the reversing switch 14 are connected to the opposite terminals of a direct voltage source 15, which provide high potentials of opposite polarity with respect to ground. If desired, the voltages provided by the source 15 may be varied.

Means such as a conduit 16 are provided for supplying gas into the container 10. Valves or other selectively openable and closeable means 31 in the walls 11 permit the gas to flow into all of the compartments in the container 10. To facilitate even distribution of the gas throughout the container 10 an outlet to a conduit 17 may be provided at the end of the container 10 opposite the inlet connected to the conduit 16. Each compartment A is connected with a gas conduit 18, and each compartment D is connected with a gas conduit 19. Valves 26, 27, 28, and 29 are provided to open and close the conduits 16, 17, 18, and 19, respectively.

FIG. 1, operation

The apparatus of FIG. 1 operates in the following manner to separate donor components from acceptor components in gases.

All compartments A and D are filled via the valves 26, 31 with a gas mixture containing both donor and acceptor components, as well as various neutral components if necessary or feasible. The donor type gases are absorbed on the p-type coated plates P, and the acceptor gases are adsorbed on the n-type coated plates N. The adsorption is accelerated by throwing the reversing switch 14 to the right, to charge the plates P positively with respect to the grounded container 10 and walls 11. This makes the plates P more p-type and increases the amount of donor gas adsorbed on them. At the same time the plates N are charged negatively with respect to the container 10 and walls 11. Thus they become more n-type and adsorb more acceptor-type gas.

After a suitable time, the inlet valve 26 is closed, and any gas remaining in the container 10 is pumped out through the outlet valve 27 and the conduit 17. Then the outlet valve 27 is closed, and the valve means 31 in the inner walls 11 are also closed to separate the compartments D from the compartments A.

The reversing switch 14 now is thrown to the left, to reverse all of the electric fields in the container 10, and thus to reverse the conductivity type of each semiconductor surface of the coated plates N, P. The donor components of the gas adsorbed by the previously p-type semiconductor surfaces of the plates P are desorbed therefrom because of the change in conductivity induced by the electric field. Similarly the acceptor components of the gas which had been adsorbed by the previously n-type semiconductor surfaces of the plates N are desorbed by the same surfaces, which are now p-type. Because of the changes in conductivity induced by the applied electric fields, the compartments A of the container 10 now contain a substantial proportion of the acceptor components of the original gas, while the compartments D contain a substantial proportion of the donor components of the original gas.

The acceptor valve 28 and the donor valve 29, which had remained closed, are now opened. The acceptor components of the gas are pumped out of the compartments A through the conduit 18, and the donor components of the gas are pumped out of the compartments D through the conduit 19. After the donor and acceptor components of the gas have been removed, the valves 28, 29 are closed, and the entire operation may be repeated.

Figure 2:
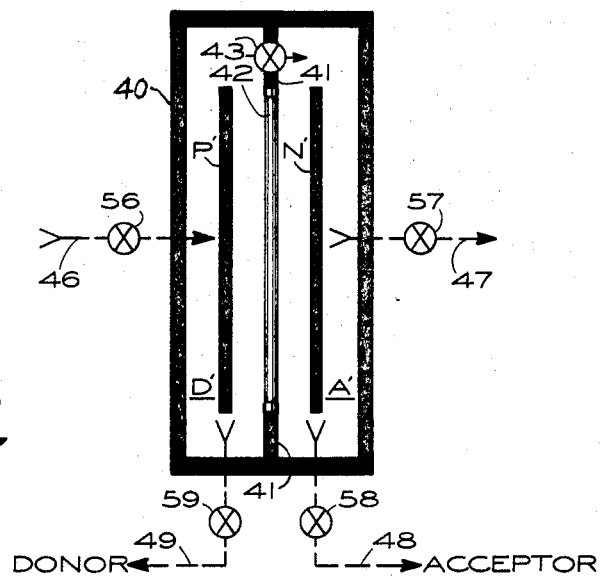

FIG. 2, description

Other techniques also may be used to modify the conductivity of a semiconductor and induce adsorption or desorption. One such method involves illumination of the semiconductor with light or other radiation of such wavelength that each photon can excite electrons or holes across the band gap or from traps in the band gap. A typicial arrangement for this purpose is shown in FIG. 2.

Referring to FIG. 2, a fluid-tight container 40 is divided into two compartments D' and A' by an interior wall 41 located parallel to and approximately midway between the long walls of the container 40. In the compartment D' is a conductive member P' which may be in the form of a plate, porous metal, or a screen parallel to the wall 41 and approximately midway between the adjacent wall of the container 40 and the interior wall 41. In the compartment A' is a conductive member N' which may be in the form of a plate, porous metal, or a screen parallel to the wall 41 and approximately midway between the adjacent wall of the container 40 and the interior wall 41. The surfaces of the conductive member N' comprise a coating of semiconductor material, such as zinc oxide, which is normally n-type and the conductivity of which can be modified substantially by radiation. The surfaces of the conductive member P' comprise a coating of semiconductor material, such as nickel oxide, which is normally p-type and the conductivity of which can be modified substantially by radiation.

Mounted in the interior wall 41, in a fluid-tight mounting therein, is a lamp 42 for producing ultraviolet or visible radiation to the surfaces of the plate P' in the compartment D' and to the surfaces of the plate N' in the compartment A'.

Means such as a conduit 46 are provided for supplying gas into the container 40. A valve or other selectively openable and closeable means 43 in the wall 41 permits the gas to flow through the compartment D' and into the compartment A'. To facilitate even distribution of the gas throughout the container 40 an outlet to a conduit 47 may be provided at the end of the container 40 opposite the inlet connected to the conduit 46. The compartment A' is connected with a gas conduit 48, and the compartment B' is connected with a gas conduit 49. Valves 56, 57, 58, and 59 are provided to open and close the conduits 46, 47, 48, and 49 respectively. Of course additional pairs of compartments D', A' may also be included and arranged as in FIG. 1 to provide a larger capacity.

FIG. 2, operation

The apparatus of FIG. 2 operates in the following manner to separate donor components from acceptor components in gases.

The compartments D' and A' are filled via the valves 56, 43 with a gas mixture containing both donor and acceptor components, as well as various neutral components if necessary or feasible. The donor type gases are absorbed on the p-type coated plate P' and the acceptor gases are absorbed on the n-type coated plate N'.

After a suitable time, the inlet valve 56 is closed, and any gas remaining in the container 40 is pumped out through the outlet valve 57 and the conduit 47. The outlet valve 57 is closed, and the valve means 43 in the inner wall 41 is also closed to separate the compartment D' from the compartment A'.

The lamp 42 is then turned on. The radiation from the lamp 42 produces holes and electrodes in the semiconductor coatings on the plates P', N'. This modifies the conductivity of each surface sufficiently to desorb substantially all of the donor components of the gas adsorbed by the surface of the plate P', and to desorb substantially all of the acceptor components of the gas adsorbed by the surface of the plate N'. Because of the changes in conductivity induced by the radiation from the lamp 42, the compartment A' of the container 40 now contains a substantial proportion of the acceptor components of the original gas, while the compartment D' contains a substantial proportion of the donor components of the original gas.

The acceptor valve 58 and the donor valve 59, which had remained closed, are now opened. The acceptor components of the gas are pumped out of the compartment A' through the conduit 48, and the donor components of the gas are pumped out of the compartment D' through the conduit 49. After the donor and acceptor components of the gas have been removed, the valves 58, 59 are closed, and the entire operation may be repeated.

Remarks

In either form of the invention, other semiconductor materials may be used if desired. For example, the normally p-type surfaces may comprise any suitable p-type semiconductor material such as copper oxide; or other semiconductor materials such as silicon, germanium, intermetallic compounds, organic materials, suitably doped with acceptor impurities to make the conductivity p-type. The normally n-type surfaces may comprise any suitable n-type material such as silicon, germanium, intermetallic compounds, or organic semiconductors, suitably doped with donor impurities to make the conductivity n-type.

The apparatus of this invention can be used to separate water vapor from air. Using appropriate voltages, semiconductor materials, times, temperatures, etc., which may be determined from theoretical considerations and routine tests, any two gases that differ in their electronic properties can be separated similarly. For example, oxygen can be separated from nitrogen; carbon monoxide from air; ammonia from nitrogen; etc. Other useful examples are the separation of oxygen from carrier gases like argon in gas chrmomatography, and separation of nitrogen from carbon monoxide in mass spectrometry using a p-type adsorbent such as nickel oxide.

Two recent publications relevant to this invention are:

"The Electronic 'Sponge'—selective gas adsorber," Industrial Research, May 1968, page 9.

"Chemisorption of Oxygen on Zinc Oxide, Effect of a DC Electric Field," Surface Science 11, (1968), No. 2, Stuart A. Hoenig and John R. Lane.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

I claim:

1. Apparatus for separating donor components from acceptor components in gases, comprising in combination a housing containing:
    means for providing originally an n-type semiconductor surface capable of adsorbing acceptor components of a gas;
    means for providing originally a p-type semiconductor surface capable of adsorbing donor components of a gas;
    means for exposing said surfaces to a gas;
    means for removing from communication with said surfaces substantially all of said gas not adsorbed after exposure of said surfaces thereto;
    means for modifying the conductivity of said n-type surface sufficiently to desorb substantially all of any gas component adsorbed thereto;
    means for modifying the conductivity of said p-type surface sufficiently to desorb substantially all of any gas component adsorbed thereto;
    means for collecting any gas component desorbed from the originally n-type surface at a first location; and
    means for collecting any gas component desorbed from the originally p-type surface at a second location that is separated from said first location.

2. Apparatus as in claim 1, wherein said conductivity modifying means reverse the conductivities of the respective surfaces.

3. Apparatus as in claim 1, wherein said surface providing means comprise means for originally subjecting said surfaces to an electric field.

4. Apparatus as in claim 3, wherein said conductivity modifying means comprise means for subjecting said surfaces to an electric field of polarity opposite to that of the field to which they were originally subjected.

5. Apparatus as in claim 1, wherein said conductivity modifying means comprise means for subjecting said surfaces to radiation.

References Cited

UNITED STATES PATENTS

| 2,998,308 | 8/1961  | Ruth      | 23—2.2   |
| 3,344,052 | 9/1967  | Yeh       | 204—177  |
| 3,359,707 | 12/1967 | Jean      | 55—33    |
| 3,400,069 | 9/1968  | Dreckmann | 55—33    |

REUBEN FRIEDMAN, Primary Examiner

CHARLES N. HART, Assistant Examiner

U.S. Cl. X.R.

55—12, 70, 110, 131, 139, 154; 204—177